United States Patent
Lampe et al.

(10) Patent No.: US 7,719,376 B2
(45) Date of Patent: May 18, 2010

(54) AVOIDANCE OF DISCONTINUITIES WHEN SWITCHING BETWEEN MODULATION SCHEMES

(75) Inventors: Alexander Lampe, Leipzig (DE); Rainer Dietsch, Heroldsberg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 1001 days.

(21) Appl. No.: 10/581,804

(22) PCT Filed: Nov. 24, 2004

(86) PCT No.: PCT/IB2004/052524

§ 371 (c)(1),
(2), (4) Date: Jun. 2, 2006

(87) PCT Pub. No.: WO2005/055541

PCT Pub. Date: Jun. 16, 2005

(65) Prior Publication Data

US 2009/0015344 A1 Jan. 15, 2009

(30) Foreign Application Priority Data

Dec. 4, 2003 (EP) .................................. 03104545

(51) Int. Cl.
  *H03K 7/10* (2006.01)
  *H04L 27/36* (2006.01)
(52) U.S. Cl. ........................ 332/108; 370/345; 375/273; 375/274; 375/279; 375/305; 375/308; 375/323; 375/329; 375/336; 332/100; 332/103
(58) Field of Classification Search .................. 332/108, 332/100, 103; 455/102; 375/305, 308, 329, 375/336, 273, 274, 279, 323; 370/345
See application file for complete search history.

(56) References Cited

U.S. PATENT DOCUMENTS

| | | | |
|---|---|---|---|
| 5,602,868 A * | 2/1997 | Wilson | 375/219 |
| 6,369,666 B1 * | 4/2002 | Simon et al. | 332/100 |
| 6,445,745 B1 | 9/2002 | Bontu et al. | |
| 6,658,067 B1 * | 12/2003 | Piirainen et al. | 375/308 |
| 6,865,235 B2 * | 3/2005 | Khoini-Poorfard | 375/272 |
| 6,999,439 B2 * | 2/2006 | Takano | 370/335 |
| 7,069,489 B2 * | 6/2006 | Murakami et al. | 714/746 |

FOREIGN PATENT DOCUMENTS

| | | |
|---|---|---|
| EP | 0 881 806 A2 | 12/1998 |
| WO | WO 03/036896 | 5/2003 |
| WO | WO 2004/021659 | 3/2004 |

OTHER PUBLICATIONS

Bode et al: "Combined GMSK and 8PSK Modulator for GSM and EDGE"; IEEE International Symposium on Circuits and Systems; May 28, 2003; pp. 614-III 617.
* cited by examiner

*Primary Examiner*—Robert Pascal
*Assistant Examiner*—Levi Gannon
(74) *Attorney, Agent, or Firm*—Seed IP Law Group PLLC; Timothy L. Boller

(57) ABSTRACT

Modulator system (1) comprising modulators (2, 3, 4) for modulating input signals (A) according to different modulation schemes (8PSK, GMSK) cause discontinuities in the output signals (F) when switching between the schemes. By providing the modulator systems (1) with compensators (13, 22-26) for compensating amplitudes/phases of the output signals (F) of the modulator system (1) for discontinuities, these discontinuities resulting from modulation scheme changes are reduced to a large extent. This may be done before/after the pulse shapers (11, 21). The compensators (13, 22-26) comprise multipliers for multiplying pulse shaped modulated signals with complex valued waveforms (E), or for multiplying modulated signals with waveforms (S, T), or for multiplying complex valued signals (B, C, D) with complex valued phase offsets (X, Y, Z), which complex valued signals (B, C, D) are to be multiplied with mapped input signals. As a result, the output signals (F) and/or power amplifiers (33) situated after the modulator system (1) no longer need to be ramped down.

11 Claims, 3 Drawing Sheets

AVOIDANCE OF DISCONTINUITIES WHEN SWITCHING BETWEEN MODULATION SCHEMES

The invention relates to a modulator system comprising a first modulator for modulating an input signal according to a first modulation scheme and a second modulator for modulating the input signal according to a second modulation scheme, to a transmitter comprising such a modulator system, to a modulator, to a method and to a processor program product.

Examples of such a transmitter are mobile radio terminals and base stations and network nodes operating in a Global System for Mobile telecommunication (GSM) supporting an Enhanced General Packet Radio Service (EGPRS) or a Universal Mobile Telecommunication System (UMTS).

A prior art modulator system is known from the article "Combined GMSK and 8PSK Modulator for GSM and EDGE, by Peter Bode and Alexander Lampe, Philips Semiconductors Nuremberg, Germany, and Markus Helfenstein, Philips Semiconductor Zürich, Switserland, which discloses in its FIG. 5 a first modulator (modulation scheme: eight Phase Shift Keying or 8PSK) and in its FIG. 6 a second modulator (modulation scheme: Gaussian Minimum Shift Keying or GMSK). During a modulation scheme change, discontinuities in the output signal of the modulator system may arise, which increase the adjacent channel interference. To avoid this adjacent channel interference, a power amplifier for amplifying this output signal is ramped down during the modulation scheme change. This ramping down is realized by creating a zero output signal of the modulator system through signal shaping during the modulation scheme change.

The known modulator system is disadvantageous, inter alia, due to causing the power amplifier to be ramped down. This limits the possible power amplifiers to be used. Some power amplifiers may not be ramped down and require an always non-zero signal at their input.

It is an object of the invention, inter alia, to provide a modulator system having relatively little discontinuities in its output signal during a modulation scheme change, without this output signal being ramped down.

Furthers objects of the invention are, inter alia, to provide a transmitter comprising such a modulator system having relatively little discontinuities in its output signal during a modulation scheme change, without this output signal being ramped down, and a modulator, a method and a processor program product all having relatively little discontinuities in their output signal during a modulation scheme change, without this output signal being ramped down.

The modulator system according to the invention comprises a first modulator for modulating an input signal according to a first modulation scheme and a second modulator for modulating the input signal according to a second modulation scheme, which modulator system comprises a compensator for combining at least one modulator signal with at least one waveform for compensating at least one signal parameter of an output signal for discontinuities resulting from a modulation scheme change.

By providing the modulator system with the compensator for compensating one or more signal parameters of the output signal of the modulator system for discontinuities, these discontinuities resulting from modulation scheme changes are reduced to a relatively large extent. The combining like for example multiplying and/or adding of a for example modulated signal with a waveform allows at least one modulated signal to be adapted in such a way that a discontinuity between a first modulation signal modulated according to a first modulation scheme and a second modulation signal modulated according to a second modulation scheme is smoothened to a relatively large extent. Usually this will be done during a so-called guard interval located between some data symbols and (three) tail symbols respectively on one side and (three) tail symbols and some data symbols respectively on the other side. Alternative guard intervals can be located between some data symbols on one side and some data symbols on the other side.

A first embodiment of the modulator system according to the invention is defined by further comprising at least one pulse shaper, with the compensator being located after the pulse shaper. By locating the compensator after the one or more pulse shapers of the modulators, these modulators themselves do not need to be amended.

A second embodiment of the modulator system according to the invention is defined by the compensator comprising a multiplier for multiplying the modulator signal in the form of at least one pulse shaped modulated signal with the waveform in the form of a complex valued waveform, with the at least one signal parameter comprising an amplitude and a phase. By providing the compensator when located after the one or more pulse shapers with the multiplier, discontinuities in the amplitude as well as in the phase of at least one pulse shaped modulated signal are smoothened via one multiplier receiving the complex valued waveform.

A third embodiment of the modulator system according to the invention is defined by further comprising at least one pulse shaper, with the compensator being located before the pulse shaper. By locating the compensator before the one or more pulse shapers of the modulators, the compensator can be integrated into the modulators. Usually, a first part of the compensator will be integrated into the first modulator, and a second part of the compensator will be integrated into the second modulator.

A fourth embodiment of the modulator system according to the invention is defined by the compensator comprising at least one multiplier for multiplying the modulator signal in the form of at least one modulated signal with the waveform, with the at least one signal parameter comprising an amplitude. By providing the compensator when located before the one or more pulse shapers with at least one but usually two multipliers, discontinuities in the amplitude of at least one modulated signal are smoothened via the one or two multipliers receiving the waveform. This waveform may be in the form of a complex valued waveform, which possibly but not exclusively comprises a real valued waveform only.

A fifth embodiment of the modulator system according to the invention is defined by each modulator comprising at least one multiplier for multiplying a mapped input signal with a complex valued signal, with the compensator comprising at least one multiplier for multiplying the modulator signal in the form of the complex valued signal with the waveform in the form of a complex valued phase offset, with the at least one signal parameter comprising a phase. By providing the compensator when located before the one or more pulse shapers with the at least one but usually three additional multipliers, one additional multiplier for one prior art multiplier in the first modulator and two multipliers for two prior art multipliers in the second modulator, thereby suggesting that the second modulator is based on a two branch modulation scheme, discontinuities in the phase of at least one modulated signal are smoothened. Thereto, per modulation scheme, usually a different phase offset will need to be multiplied to the complex valued signal.

A sixth embodiment of the modulator system according to the invention is defined by the first modulation scheme being a Phase Shift Keying modulation scheme and the second modulation scheme being a Gaussian Minimum Shift Keying modulation scheme.

The transmitter according to the invention comprises a modulator system comprising a first modulator for modulating an input signal according to a first modulation scheme and a second modulator for modulating the input signal according to a second modulation scheme, which modulator system comprises a compensator for combining at least one modulator signal with at least one waveform for compensating at least one signal parameter of an output signal for discontinuities resulting from a modulation scheme change, which transmitter further comprises a power amplifier for amplifying the output signal. Of course, this output signal may be the output signal originating from the modulator system or a derived version thereof, like for example a digitized version thereof.

The modulator according to the invention for modulating an input signal according to a modulation scheme comprises a compensator for combining at least one modulator signal with at least one waveform for compensating at least one signal parameter of an output signal for discontinuities resulting from a modulation scheme change. This modulator either has the ability to adapt its modulation scheme, or is used in combination with an other modulator.

The method according to the invention for modulating an input signal according to a first modulation scheme and for modulating the input signal according to a second modulation scheme comprises a step of combining at least one modulator signal with at least one waveform for compensating at least one signal parameter of an output signal for discontinuities resulting from a modulation scheme change.

The processor program product according to the invention for modulating an input signal according to a first modulation scheme and for modulating the input signal according to a second modulation scheme comprises a function of combining at least one modulator signal with at least one waveform for compensating at least one signal parameter of an output signal for discontinuities resulting from a modulation scheme change.

Embodiments of the transmitter according to the invention and of the modulator according to the invention and of the method according to the invention and of the processor program product according to the invention correspond with the embodiments of the modulator system according to the invention.

The invention is based upon an insight, inter alia, that the ramping down of an output signal of the modulator system is to be avoided, and is based upon a basic idea, inter alia, that discontinuities in amplitudes and/or phases of a signal can be smoothened by adapting at least the last part of this signal before the discontinuity and/or at least the first part of this signal after the discontinuity.

The invention solves the problem, inter alia, to provide a modulator system having relatively little discontinuities in its output signal during a modulation scheme change, without this output signal being ramped down, and is advantageous, inter alia, in that this modulator system can be combined even with a power amplifier which may not be ramped down and which requires an always non-zero signal at its input.

These and other aspects of the invention will be apparent from and elucidated with reference to the embodiments(s) described hereinafter.

Figure 1:
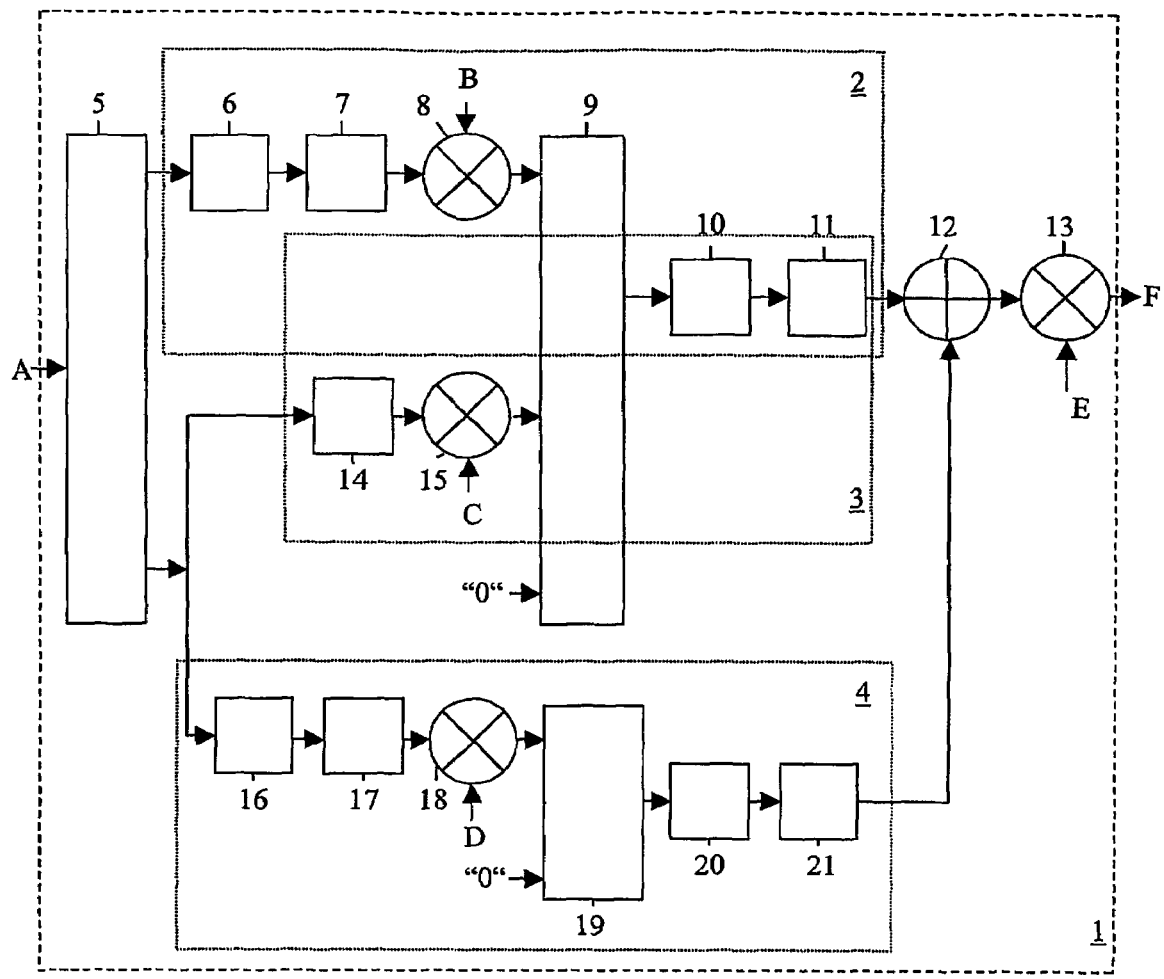
FIG. 1 shows in block diagram form a modulator system according to the invention comprising a compensator of a first type.

The modulator system 1 according to the invention as shown in FIG. 1 comprises a first eight Phase Shift Keying (8PSK) modulator 2 and a second Gaussian Minimum Shift Keying (GMSK) modulator 3, 4 having a first modulating part 3 (first branch) and a second modulating part 4 (second branch). An input signal A is supplied to an input of a first multiplexer 5 and via a first output of the first multiplexer 5 supplied to an input of the modulator 2 and via a second output of the first multiplexer 5 supplied to inputs of the modulating parts 3, 4. In modulator 2, the input signal A is supplied to a serial-to-parallel-converter 6 and then mapped by a mapper 7, after which the mapped signal is multiplied through a multiplier 8 with a signal B and a resulting modulated signal is supplied to a first input of a second multiplexer 9. An output signal of the second multiplexer 9 is supplied to an upsampler 10 and then pulse shaped by a pulse shaper 11 (a Finite Impulse Response (FIR) Filter), after which a first pulse shaped signal is added via an adder 12 to a second pulse shaped signal coming from the modulating part 4.

In modulating part 3, the input signal A is supplied to a mapper 14, after which the mapped signal is multiplied through a multiplier 15 with a signal C and a resulting modulated signal is supplied to a second input of the second multiplexer 9. In modulating part 4, the input signal A is supplied to a Finite State Machine (FSM) 16 and then mapped by a mapper 17, after which the mapped signal is multiplied through a multiplier 18 with a signal D and a resulting modulated signal is supplied to a first input of a third multiplexer 19. An output signal of the third multiplexer 19 is supplied to an upsampler 20 and then pulse shaped by a pulse shaper 21 (a Finite Impulse Response (FIR) Filter), after which this second pulse shaped signal is supplied to the adder 12 discussed before. The added first and second pulse shaped signals are combined with a complex valued waveform E for compensating at least one signal parameter like an amplitude or a phase of the output signal F for discontinuities resulting from a modulation scheme change, as discussed below.

The first modulator 2 modulates the input signal A according to a first modulation scheme 8PSK. Thereto, the first multiplexer 5 is controlled in such a way that the input signal is supplied to the modulator 2 and not to the modulators 3, 4. The input signal A is serial-to-parallel converted and then mapped and then multiplied with the signal B, with the signal B for example being equal to exp j($3\pi k/8$). The second multiplexer 9 is controlled in such a way that the resulting modulated signal is upsampled and pulse shaped. In a prior art situation, with the multiplier 13 not being present, the upsampled and pulse shaped modulated signal forms the output signal F of the modulator system 1 in case of this modulator system 1 being in a 8PSK mode. Thereto, the third multiplexer 19 is controlled in such a way that a second input of this third multiplexer 19 receiving a zero signal is coupled to the third multiplexer's output.

The second modulator 3, 4 modulates the input signal A according to a second modulation scheme GMSK. Thereto, the first multiplexer 5 is controlled in such a way that the input signal is supplied to the modulator 3, 4 and not to the modulator 2. In the modulating part 3, the input signal A is mapped and then multiplied with the signal C, with the signal C for example being equal to exp j($\pi$k/2). In the modulating part 4, the input signal A is processed by the FSM 16 and is mapped and then multiplied with the signal D, with the signal D for example being equal to exp j($\pi$[k−1]/2). The second multiplexer 9 and the third multiplexer 19 are controlled in such a way that the resulting modulated signals can be upsampled and pulse shaped. In a prior art situation, with the multiplier 13 not being present, the upsampled and pulse shaped modulated signals form the output signal F of the modulator system 1.

So, by controlling the multiplexers 5, 9 and 19, the modulation scheme can be selected. In case of a modulation scheme change, discontinuities in the output signal F of the modulator system 1 may arise, which increase the adjacent channel interference. To avoid increased adjacent channel interference, these discontinuities can be avoided by introducing multiplier 13 (a compensator of a first type). For example, in case of four GMSK symbols arriving from the adder 12 and being fed into the multiplier 13 and then four 8PSK symbols arriving from the adder 12 and being fed into the multiplier 13 during a guard interval comprising eight symbols, the amplitudes for example equal 1, 1, 1, 1, 0.7, 0.7, 0.7 and 0.7. To avoid amplitude discontinuities, the amplitudes of eight samples of the complex valued waveform E could be chosen as 1, 0.96, 0.91, 0.86, 1.14, 1.09, 1.03 and 1. The amplitudes of the output signal of the multiplier 13 then equal 1, 0.96, 0.91, 0.86, 0.8, 0.76, 0.72 and 0.7. As a result, the amplitude smoothly decreases from 1 to 0.7, and any amplitude discontinuities in the output signal F have been avoided. The same way, any phase discontinuities in the output signal F can be avoided by supplying the eight samples of the complex valued waveform having appropriately chosen phases.

Figure 2:
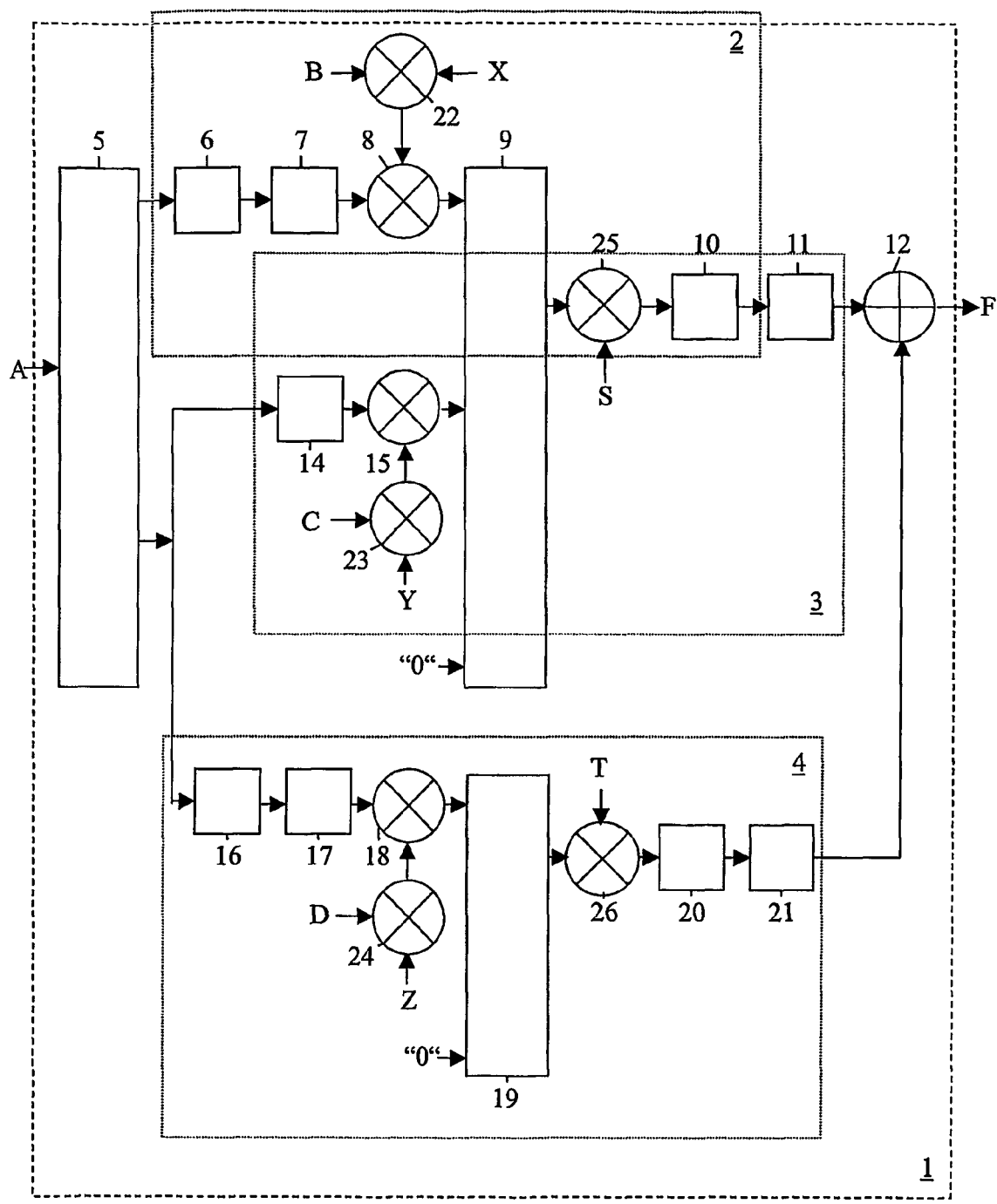
FIG. 2 shows in block diagram form a modulator system according to the invention comprising a compensator of a second and a third type.

The modulator system 1 according to the invention as shown in FIG. 2 corresponds with the modulator system 1 according to the invention as shown in FIG. 1, apart from the following. Instead of multiplier 13, now multipliers 25, 26 respectively have been introduced (a compensator of a second type) located between multiplexers 9, 19 and upsamplers 10, 20 respectively for multiplying the output signals of the multiplexers 9, 19 with waveforms S, T respectively, and multipliers 22, 23, 24 respectively have been introduced (a compensator of a third type), coupled to multipliers 8, 15, 18 respectively for multiplying the signals B, C, D respectively with the complex valued phase offsets X, Y, Z respectively.

A possible setting of the multiplexers 9 (mux 9) and 19 (mux 19) during a transition from GMSK to 8PSK is as follows:

| Mux 9  | ...G G G | G G G | G G G G P P P P | P P P | P P P... |
|---|---|---|---|---|---|
| Mux 19 | ...G G G | G G G | G G G G 0 0 0 0 | 0 0 0 | 0 0 0... |

The first column with symbols shows the last three data symbols, the second column shows three tail symbols, the third column shows eight guard symbols, the fourth column shows three tail symbols, and the fifth column shows the first three data symbols.

The complex valued phase offset X for example equals exp j[$\phi_{8PSK}$]=exp j[arg(g[k])+$\pi$k/2+$\Phi_{GMSK}$−arg(p[k+1])−3$\pi$(k+1)/8+$\Delta\Phi$], thereby suggesting that the last GMSK symbols and the first 8PSK symbols are fed into the multiplexers 9, 19 at symbol interval k and k+1 respectively, and that $\phi_{GMSK}$ denotes the phase offset of a preceding GMSK modulated burst and that A, denotes a phase angle defining the phase difference between the last GMSK symbol and the first 8PSK symbol. In case all symbols G[k], P[k] equal "1" in the guard interval, an appropriate choice for $\Delta\phi$ is for example 3$\pi$/8. With this choice, the GMSK symbol fed into the multiplexer in symbol interval k looks like a preceding 8PSK "1" for the 8PSK symbol passed to the multiplexer in symbol interval k+1. The phase offset $\phi$8PSK is updated when switching from GMSK to 8PSK and remains constant during an 8PSK modulated burst.

A possible setting of the multiplexers 9 (mux 9) and 19 (mux 19) during a transition from 8PSK to GMSK is as follows:

| Mux 9  | ...P P P | P P P | P P P P G G G G | G G G | G G G... |
|---|---|---|---|---|---|
| Mux 19 | ...0 0 0 | 0 0 0 | 0 0 0 0 G G G G | G G G | G G G... |

The first column with symbols shows the last three data symbols, the second column shows three tail symbols, the third column shows eight guard symbols, the fourth column shows three tail symbols, and the fifth column shows the first three data symbols.

The complex valued phase offset Y, Z for example equals exp j[$\phi$GMSK]=exp j[arg(p[k])+3$\pi$k/8+$\phi_{8PSK}$−arg(g[k+1])−$\pi$(k+1)/2+$\Delta\phi$], thereby suggesting that the last 8PSK symbols and the first GMSK symbols are fed into the multiplexers 9, 19 at symbol interval k and k+1 respectively, and that $\phi_{8PSK}$ denotes the phase offset of a preceding 8PSK modulated burst and that $\Delta\phi$ denotes a phase angle defining the phase difference between the last 8PSK symbol and the first GMSK symbol. In case all symbols P[k], G[k] equal "1" in the guard interval, an appropriate choice for $\Delta\phi$ is for example $\pi$/2. With this choice, the 8PSK symbol fed into the multiplexer in symbol interval k looks like a preceding GMSK "1" for the GMSK symbol passed to the multiplexer in symbol interval k+1. The phase offset $\phi_{GMSK}$ is updated when switching from 8PSK to GMSK and remains constant during a GMSK modulated burst.

Figure 3:
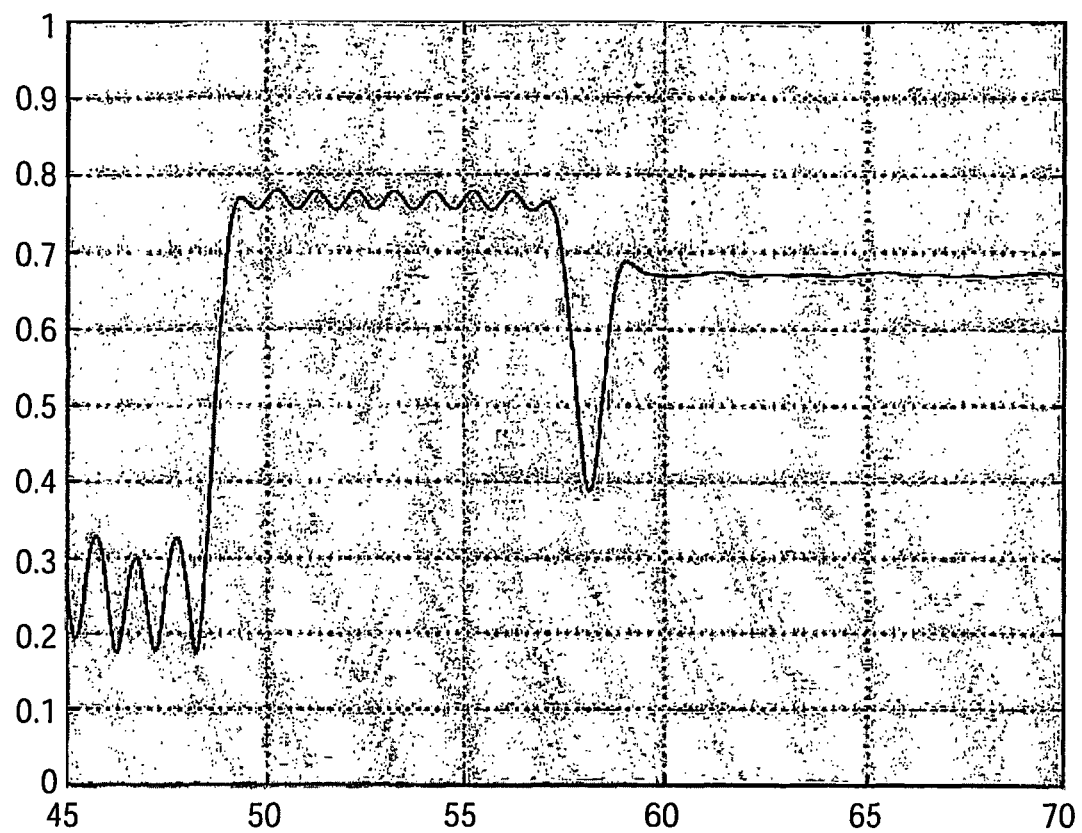
FIG. 3 shows in an upper graph (prior art) an absolute value of an output signal created without compensation and in a lower graph (invention) an absolute value of an output signal created through compensation before pulse shaping.
Figure 3:
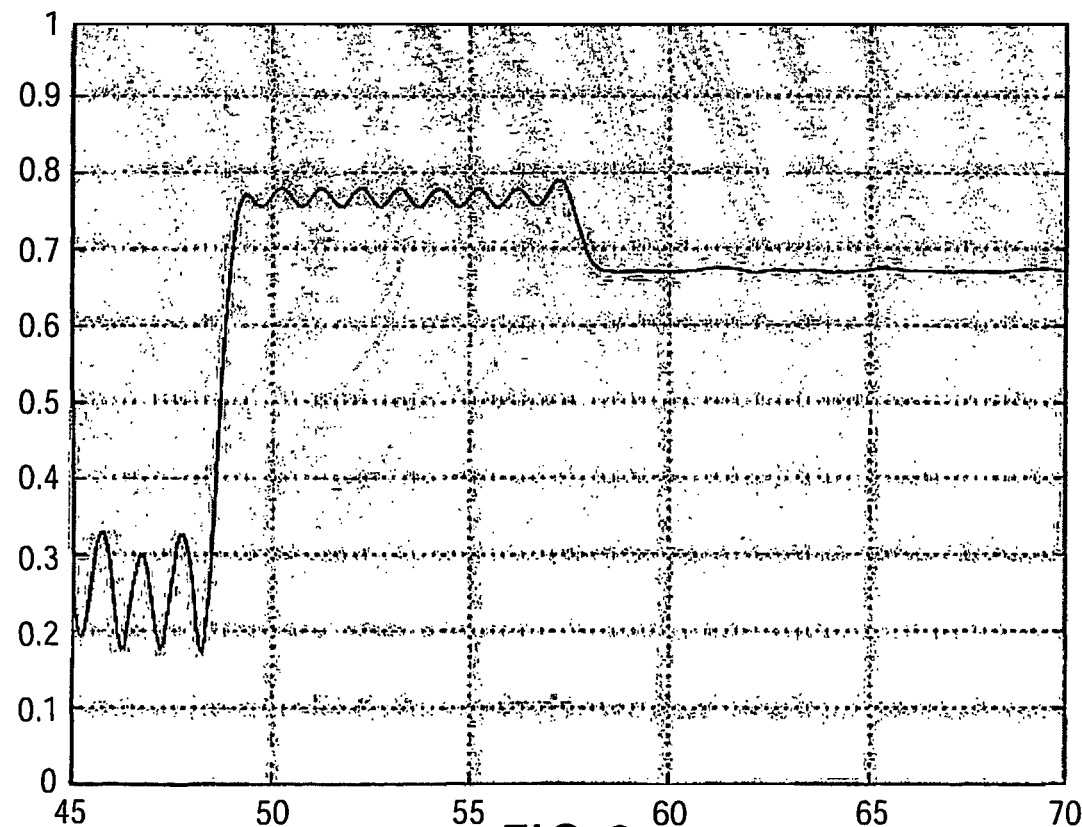

FIG. 3 shows in an upper graph (prior art) an absolute value of an output signal F after digital-to-analog-conversion created without compensation and in a lower graph (invention) an absolute value of an output signal F after digital-to-analog-conversion created through compensation by multiplying the modulator signal in the form of the complex valued signal B, C, D with the waveform X, Y, Z in the form of a complex valued phase offset X, Y, Z, before pulse shaping. The modulation scheme change from 8PSK to GMSK takes place between symbol interval 56 and 57, with all symbols P(k), G(k) chosen to have the value "1" in the guard interval (53-60).

When demanding equal peak values for GMSK and 8PSK, the samples of the waveforms S, T should be "1" for 8PSK and about "1.5" for GMSK, when demanding equal root mean square values these samples should all be "1".

The modulator system 1 as shown in FIG. 2 calculates a phase offset Y, Z and rotates GMSK pulse shaping filter input symbols therewith, and calculates a phase offset X and rotates 8PSK pulse shaping filter input symbols therewith, and calculates an amplitude waveform S, T and multiplies GMSK/8PSK pulse shaping filter input symbols therewith.

The modulator system 1 as shown in FIGS. 1 and 2 minimizes adjacent channel interference, improves the stability of phase and/or amplitude loops controlled by the output signal F, does not require ramping and ramping calculations, is simple, allows a fast transition between modulation schemes, and offers amplitude smoothing when changing between equal root mean square values and peak values for GMSK and 8PSK for free.

Figure 4:
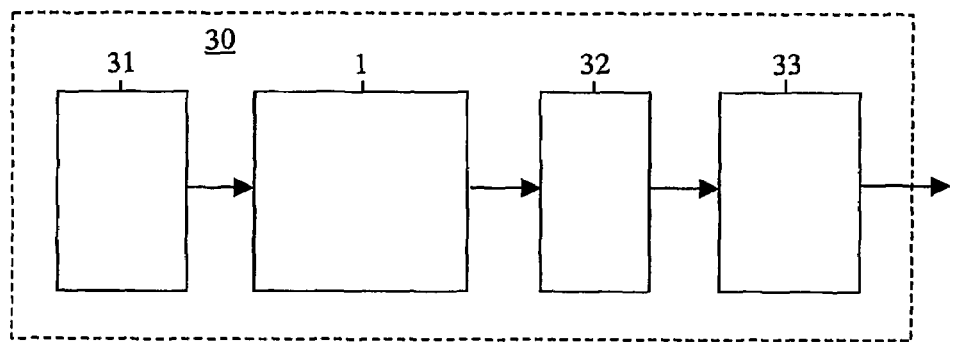
FIG. 4 shows in block diagram form a transmitter according to the invention.

The transmitter 30 as shown in FIG. 4 comprises an input stage 31 for generating the input signal A for the modulator system 1, and comprises for example a digital-to-analog-converter 32 for converting the output signal F into an analog signal, and comprises for example a power amplifier 33 for amplifying the analog output signal.

Alternative modulation schemes like for example 4PSK or 16PSK instead of 8PSK and alternative modulator system constructions are possible. Instead of multiplying exp j(a) and exp j(b), the adding of a+b could be performed, and vice versa: exp j(a)*exp j(b)=exp j(a+b).

A complex valued waveform comprises a real valued waveform, an imaginary valued waveform, or a combination of both.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. The mere fact that certain measures are recited in mutually different dependent claims does not indicate that a combination of these measures cannot be used to advantage.

The invention claimed is:

1. A modulator system comprising:
    a first modulator configured to modulate an input signal according to a first modulation scheme;
    a second modulator configured to modulate the input signal according to a second modulation scheme;
    a compensator configured to combine at least one modulator signal with at least one waveform to compensate at least one signal parameter of an output signal for discontinuities resulting from a modulation scheme change, wherein each modulator comprises at least one multiplier configured to multiply a mapped input signal with a complex valued signal and the compensator comprises at least one multiplier configured to multiply the at least one modulator signal in the form of the complex valued signal with the waveform in a form of a complex valued phase offset with the at least one signal parameter comprising a phase; and
    at least one pulse shaper coupled to an output of the compensator.

2. The modulator system of claim 1, further comprising: a least one upsampler coupled between the compensator and the at least one pulse shaper.

3. The modulator system of claim 2 wherein the at least one signal parameter comprises an amplitude and a phase.

4. The modulator system of claim 1 wherein the first modulation scheme is a Phase Shift Keying modulating scheme and the second modulation scheme is a Gaussian Minimum Shift Keying modulation scheme.

5. The modulator of claim 1, further comprising an adder configured to add the pulse-shaped output of the compensator to another pulse-shaped compensated signal.

6. A transmitter comprising:
    a first modulator configured to modulate an input signal according to a first modulation scheme;
    a second modulator configured to modulate the input signal according to a second modulation scheme; and
    a compensator configured to combine at least one modulator signal with at least one waveform to compensate at least one signal parameter of an output signal for discontinuities resulting from a modulation scheme change, wherein each modulator comprises at least one multiplier configured to multiply a mapped input signal with a complex valued signal and the compensator comprises at least one multiplier configured to multiply the at least one modulator signal in the form of the complex valued signal with the waveform in the form of a complex valued phase offset with the at least one signal parameter comprising a phase;
    at least one pulse shaper coupled to an output of the compensator; and
    configured to amplify an output of the transmitter.

7. A modulator to modulate an input signal according to a modulation scheme, the modulator comprising:
    a compensator configured to combine at least one modulator signal with at least one waveform to compensate at least one signal parameter of an output signal for discontinuities resulting from a modulation scheme change, wherein the modulator comprises at least one multiplier configured to multiply a mapped input signal with a complex valued signal and the compensator comprises at least one multiplier configured to multiply the at least one modulator signal in the form of the complex valued signal with the waveform in the form of a complex valued phase offset with the at least one signal parameter comprising a phase; and
    at least one pulse shaper coupled to an output of the compensator.

8. A method of modulating an input signal according to a first modulation scheme and modulating the input signal according to a second modulation scheme, the method comprising:
    combining at least one modulator signal with at least one waveform for compensating at least one signal parameter of an output signal for discontinuities resulting from a modulation scheme change, wherein the at least one modulator signal comprises a mapped input signal multiplied by a complex valued signal and the combining comprises multiplying the at least one modulator signal in the form of the complex valued signal with the waveform in a form of a complex valued phase offset with the at least one signal parameter comprising a phase; and
    pulse-shaping the combined at least one modulator signal and at least one waveform.

9. The method of claim 8 wherein the at least one signal parameter comprises a signal parameter having an amplitude.

10. A processor program product for causing a computer to perform a method, the method comprising:
    modulating an input signal according to a first modulation scheme;
    modulating the input signal according to a second modulation scheme;
    combining at least one modulator signal with at least one waveform for compensating at least one signal parameter of an output signal for discontinuities resulting from a modulation scheme change, wherein the at least one modulator signal comprises a mapped input signal multiplied by a complex valued signal and the combining comprises multiplying the at least one modulator signal in the form of the complex valued signal with the waveform in a form of a complex valued phase offset with the at least one signal parameter comprising a phase; and pulse-shaping the combined at least one modulator signal and at least one waveform.

11. The processor product of claim 10 wherein the at least one signal parameter comprises a signal parameter having an amplitude.

* * * * *

UNITED STATES PATENT AND TRADEMARK OFFICE
CERTIFICATE OF CORRECTION

PATENT NO. : 7,719,376 B2
APPLICATION NO. : 10/581804
DATED : May 18, 2010
INVENTOR(S) : Alexander Lampe et al.

It is certified that error appears in the above-identified patent and that said Letters Patent is hereby corrected as shown below:

Column 8, Line 20
The line "configured to amplify an output of the transmitter." should read --a power amplifier configured to amplify an output of the transmitter.--

Signed and Sealed this

Twelfth Day of October, 2010

David J. Kappos
*Director of the United States Patent and Trademark Office*